Sept. 28, 1965     A. H. VEDVIK     3,208,642
MATERIAL PICK-UP NOZZLE
Filed June 10, 1963     2 Sheets-Sheet 2
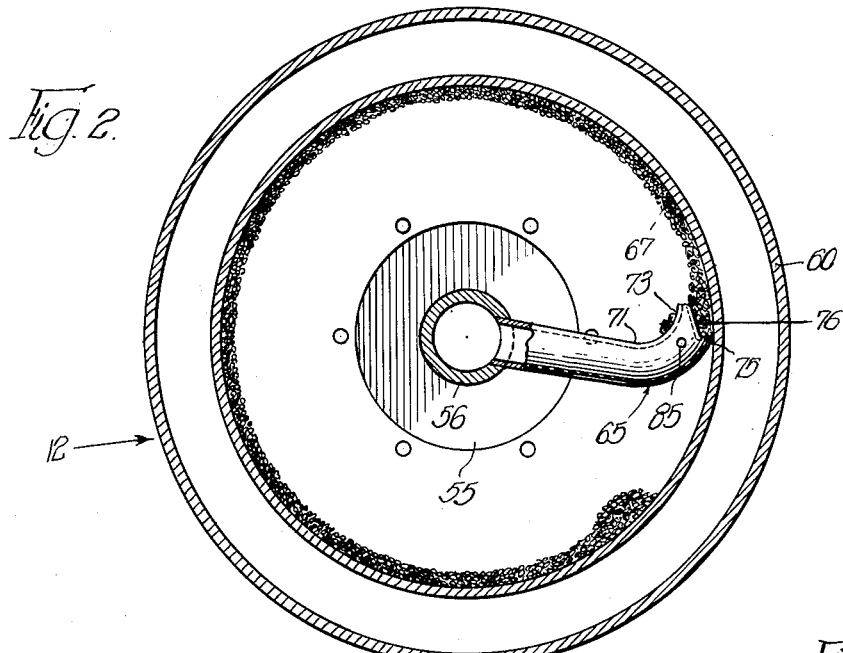
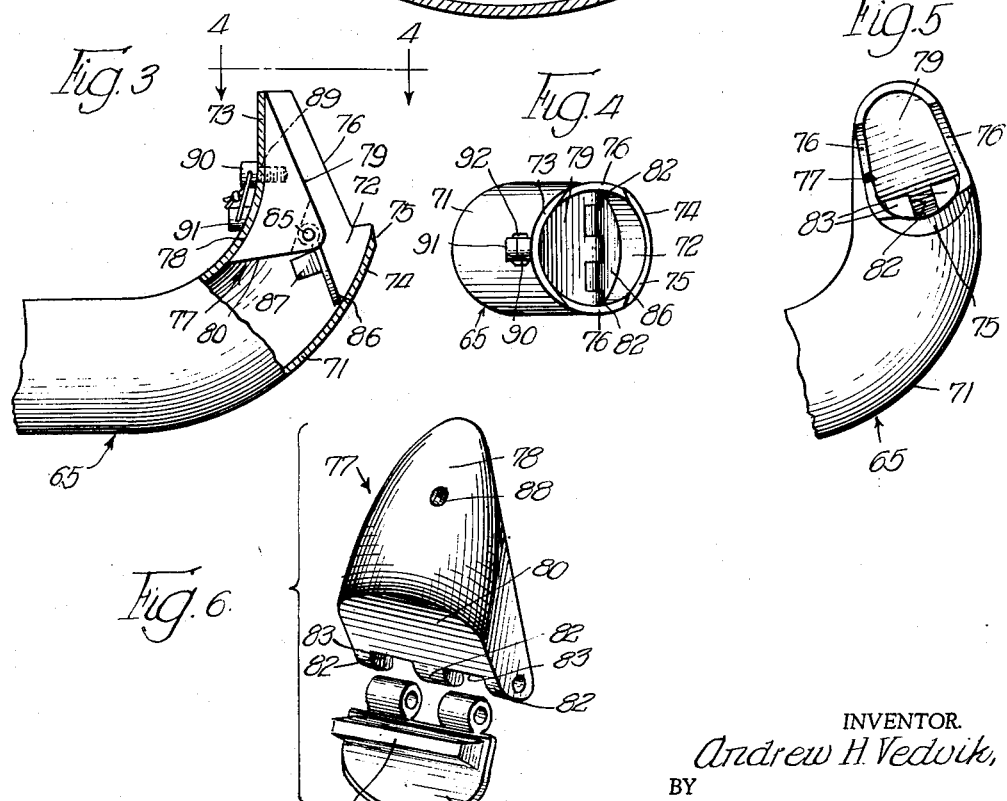
INVENTOR.
Andrew H. Vedvik,
BY
Trist, Lockwood, Greenawalt & Dewey
ATTYS.

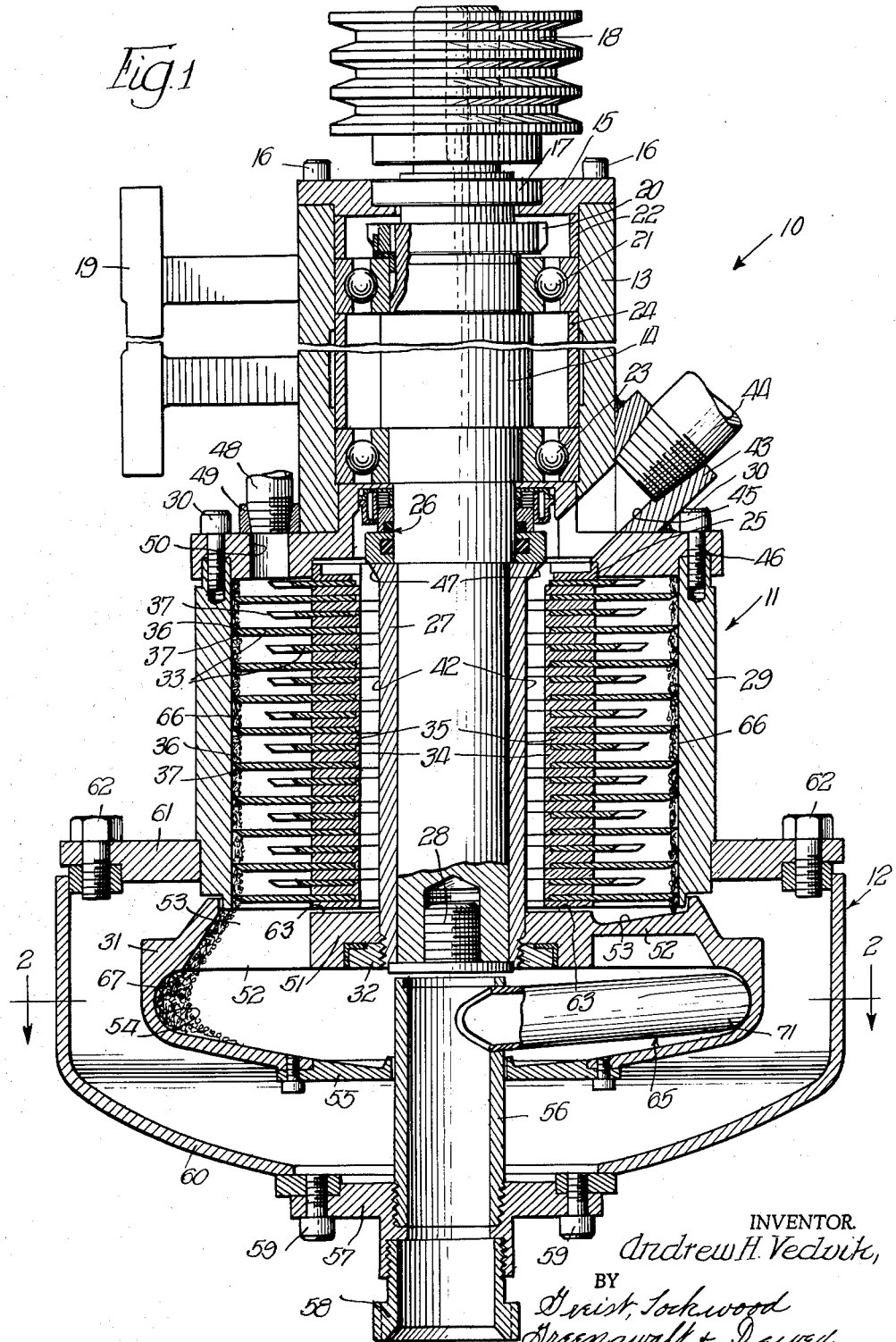

United States Patent Office 3,208,642
Patented Sept. 28, 1965

3,208,642
MATERIAL PICK-UP NOZZLE
Andrew H. Vedvik, Madison, Wis., assignor to Oscar Mayer & Company, Inc., Chicago, Ill., a corporation of Illinois
Filed June 10, 1963, Ser. No. 286,796
2 Claims. (Cl. 222—162)

The present invention is directed to a new and improved form of pick-up nozzle particularly adapted for removing a layer of fluid-like or free-flowing material from the inner peripheral surface of a rotating vessel. More specifically, the invention is directed to a nozzle of improved design and arrangement especially adapted for use with edible material in the transfer thereof from a rotating cylindrical surface to a main point of discharge.

This invention constitutes an improvement of the design of a material pick-up nozzle of the type disclosed in my U.S. Patent 3,065,882. In my patent I disclose a basic nozzle design provided with specially arranged material deflecting and material scooping or receiving lip portions with the deflecting lip portion having formed therewith a fixed baffle member extending toward the material receiving lip portion to define a confined opening at the material receiving end of the nozzle. It has been found that this basic design is especially useful in controllably discharging fibrous material dispersions, such as meat batter used in sausage-type product preparation, from a centrifugal material accumulation bowl. In the handling of this type of material it is of extreme importance to prevent contamination such as caused by deterioration of meat particles caught or otherwise retained in the equipment. It is the common practice to completely clean and disassemble food handling equipment of this type after relatively short periods of operation in order to prevent contamination and to maintain product quality. Accordingly, an important consideration of design resides in ease of disassembly of food handling equipment for cleaning purposes thus reducing the shut-down time as well as maintaining the degree of operator's skill for dismantling purposes at a minimum.

It is an object of the invention to provide a new and improved material pick-up nozzle especially adapted for use in equipment handling material readily subject to contamination, the nozzle including specially arranged elements especially designed and combined for ease of assembly and disassembly for ready cleaning thereof.

Still a further object is to provide a new and improved material pick-up nozzle especially adapted for use with fibrous material dispersions, particularly meat emulsions and the like, the nozzle having a material receiving opening of special configuration defined by uniquely arranged lip portions and the like, the nozzle further including a readily detachable plow member of special configuration having means of attachment for purposes of ready disassembly during cleaning.

Another object is to provide a new and improved form of material pick-up nozzle especially adapted for material removal from a centrifugal bowl accumulator, the nozzle including improved design features permitting ready assembly and disassembly, the elements thereof being of economical fabrication and arrangement.

Other objects not specifically set forth will become apparent from the following detailed description of the invention made in conjunction with the accompanying drawings wherein:

FIG. 1 is a fragmentary vertical section of a continuous chopper assembly utilizing the material pick-up nozzle of the present invention in a preferred embodiment wherein a centrifugal bowl accumulator forms a part of the assembly;

FIG. 2 is a horizontal section of the assembly taken generally along line 2—2 of FIG. 1;

FIG. 3 is a fragmentary enlarged horizontal section of the material receiving end of the pick-up nozzle;

FIG. 4 is a fragmentary elevation of the material receiving end of the nozzle;

FIG. 5 is a perspective of the material receiving end of the nozzle; and

FIG. 6 is a perspective of the plow member forming a part of the nozzle.

The pick-up nozzle of the present invention is particularly adapted for use in the handling of sausage batter and the like consisting basically of fibrous meat particles, water and seasoning. The use of the nozzle will be described in conjunction with a continuous chopper assembly by means of which batter for a sausage type product can be prepared. However, it will be understood that the nozzle may have other uses and the illustrated use is one for which the nozzle is especially and uniquely adapted.

FIG. 1 illustrates a continuous chopper assembly 10 which generally includes a material particle size reduction zone 11 constituting the chopper portion of the assembly and a material collection and discharge zone generally designated by the numeral 12. Specifically, the assembly 10 includes a sleeve-like upper shaft housing 13 receiving therein a shaft 14 the uppermost end of which projects outwardly of the assembly through an end cap 15 suitably connected to the top end of the housing 13 by a plurality of cap screws 16. The end cap 15 seats a suitable shaft sealing member 17 which is in engagement with the shaft 14. The upper projecting end of the shaft 14 is drive connected to a sheave 18 which is provided with a plurality of grooves in which drive belts (not shown) are received, the drive belts being suitably driven by a power source resulting in rotation of the shaft 14. As illustrated, the assembly 10 is arranged for vertical operation and for the purpose of mounting the assembly a suitable mounting bracket 19 is fixedly connected to the housing 13.

Within the housing 13, the shaft 14 has received thereabout a combined locknut and washer 20 engaging the inner race of a bearing 21 fixed on the shaft 14 and with the outer race held at one end by a bearing clamp ring 22. A spaced bearing 23 is received in the housing 13 about the shaft 14 and the bearings 21 and 23 are maintained in operative positions by a spacer sleeve 24. The lower bearing 23 is received on an upwardly projecting sleeve-like portion of a chopper housing cover plate 25, the housing 13 being mounted about the upwardly projecting portion of the cover plate 25 in fixed engagement with the surrounding top surface of the cover plate. A suitable expandable type shaft seal 26 extends between the lower bearing 23 and a sleeve 27 which is received about the bottom portion of the shaft 14. The sleeve 27 is held against axial movement relative to the shaft 14 by a lock stud 28 threadedly received in the bottom of the shaft. The cover plate 25 encloses the top of a cylindrical chopper housing 29 by means of cap screws 30.

The sleeve 27 is rotatably spline connected to the shaft 14 for rotation therewith and at the bottom thereof has spline connected thereto a bowl-shaped material collection means in the form of a rotor 31. The rotor 31 rotates with the sleeve 27 and the shaft 14 and is held against axial displacement therefrom by a locknut 32.

Within the chopper housing 29 a plurality of chopper blade members 33 are mounted by a series of alternately positioned blade mounting rings 34 and ring spacers 35. Each blade mounting ring 34 carries a series of circumferentially spaced blade members 33 on both the upper and lower surfaces thereof with the two series of blade members being circumferentially staggered. The spacers 35 are suitably designed to provide for adequate spacing between the blade mounting rings 34 and the blade members 33 carried thereby. A suitable basic arrangement is disclosed in U.S. Patent 2,974,701. Each blade member 33 is provided with a convex cutting edge 36 which includes a bevel 37 on the underside thereof.

Each blade mounting ring 34 and spacer 35 is centrally webbed adjacent the sleeve 27 and the rings and spacers are circumferentially spaced to establish a plurality of axially directed air evacuation or gas input passages or ports 42 which extend the full axial length of the sleeve 27. The passages 42 serve for air evacuation purposes as will be described although it should be understood that inert gas such as nitrogen may be injected into the assembly utilizing the ports 42 for delivery purposes.

The cover plate 25 carries an outlet fitting 43 having the end of an air suction tube or pipe 44 suitably threaded therein. The fitting 43 is aligned with an angled port 45 which extends through the cover plate 25 into communication with the top of the sleeve 27. The top of the sleeve 27 is provided with an integrally formed, radially outwardly extending cup-shaped portion 46 which includes a plurality of angled openings 47 therein which are in communication with the axially extending passages 42. Air evacuation occurs through the port 45 with air being delivered thereto through the passages 42 from between the blade members 33 (which are suitably circumferentially spaced for this purpose) and the outer peripheral comminution zone.

The operation of the chopper portion 11 of the assembly 10 is the same as disclosed in U.S. Patent 2,974,701. Material, such as relatively small chunks of meat which may have sausage batter ingredients mixed therewith, is delivered into the housing 29 through an inlet tube 48 having a nozzle portion in threaded engagement in an inlet fitting 49 suitably secured to the cover plate 25 of the housing 29, the plate 25 being provided with an inlet opening 50 which is located in close association with the outer periphery of the housing 29 directly over the uppermost series of blade members 33. The chunks of meat are continuously pumped into the chopper portion 11 and into contact with the blade members 33 which are rotated at relatively high speeds as, for example, within the range of 3,000 to 4,500 r.p.m., operation at these speeds providing adequate centrifugal force to provide for an accumulation of meat particles along the inner surface of the housing 29 to define a continuously moving layer or sleeve of meat particles which is quite viscous. The meat particles are thus placed in contact with the cutting edges 36 of the blade members 33, these cutting edges being closely spaced to the inner surface of the housing 29. The thickness of the sleeve-like accumulation of meat particles may vary from approximately ⅛ to ⅝ of an inch with the cutting edge 36 of each blade member 33 continuously moving through the accumulation for relatively fine comminution thereof. The substantial centrifugal force developed by the high speed rotation of the blade members 33 will maintain the meat particles against the inner surface of the housing 29 and the bevels 37 formed on the underside of the cutting edges 36 of the blade members 33 will provide for continuous movement of the accumulated meat particles downwardly along the inner surface of the housing 29 toward the lower discharge end of the chopper portion 11.

During comminution of the meat, continuous air evacuation occurs through the tube 44 as previously described, the air released from the meat particles as a result of comminution thereof being drawn inwardly between the blade members 33 into the passages 42 and upwardly through the ports 47 into the tube 44. A vacuum may be drawn on the system to any extent desired.

The comminuted meat particles are delivered from the chopper portion 11 of the assembly 10 into the discharge rotor 31 for centrifugal accumulation therein in a peripheral or annular layer and are then discharged therefrom in a manner to be described. The rotor 31 is in the form of a rotating vessel or bowl provided with an upstanding rim which is closely received about the lower end of the chopper housing 29 to prevent material loss therebetween. The rotor 31 includes a central hub portion 51 which is suitably spline connected to the sleeve 27 and the shaft 14, for rotation of the rotor 31 therewith. The outer bowl portion of the rotor 31 is supported by the hub 51 through a plurality of web-like vanes 52 which are beveled along the top surfaces thereof to provide angled material guiding surfaces 53. The angled surfaces 53 diverge somewhat outwardly as well as downwardly to provide a slope or pitch thereto which is inclined downwardly and outwardly to deliver the comminuted meat particles toward and into the peripheral portion of the bowl of the rotor 31.

The bowl portion of the rotor is provided with a peripheral material collecting zone 54 and includes a bottom central opening which is partially covered by a shield ring 55 suitably bolted in place. The shield ring 55 is centrally apertured and receives therethrough a stationary discharge pipe 56, adequate clearance being provided between the adjacent surfaces of the pipe 56 and the shield ring 55 to permit high speed rotation of the rotor 31 relative to the pipe 56. The pipe 56 is threadedly mounted in a bottom cover plate 57 which carries on the outer side thereof a sleeve 58 for suitable connection with a comminuted material delivery tube or pipe (not shown), the sleeve 58 being axially aligned through the plate 57 with the pipe 56.

The plate 57 is attached by cap screws 59 in covering relation with a central bottom opening in a housing 60 which is received about the rotor 31 in closing relation thereto. The upper edge of the housing 60 is circumferentially disposed somewhat above the bottom end of the chopper portion 11 and has received thereon a flange-like cover member 61 which is suitably connected thereto by removable fasteners 62. The cover 61 is fixedly attached to the outer surface of the chopper housing 29 to complete the external housing portion of the assembly and seal the rotor area. In connection with air evacuation, vacuum operation of the entire assembly is possible as the passages 42 extend downwardly throughout the entire chopper assembly 11 and are not only in communication with the comminution zone through the space between the plate members 33 as previously described but also are placed in communication with the interior of the rotor 31 through a plurality of circumferentially spaced, radially directed grooves 63 formed in the top surface of the hub 51 of the rotor 31.

The upper portion of the discharge pipe 56 which is received within the rotor 31 has suitably secured therein a radially outwardly directed material pick-up nozzle 65 which curves into close association with the surface of the rotor 31 in the material collection zone 54 whereby to receive the comminuted meat therein in a scoop-like manner during rotation of the rotor 31. The sleeve-like accumulation of comminuted material which is established and maintained in the chopper portion 11 of the assembly is illustrated in FIG. 1 and is identified by the reference numeral 66. The accumulation 66 is continuously moved downwardly along the inner surface of the chopper housing 29 and is guided by and across the inclined surfaces 53 of the vanes 52 toward the outer periphery of the interior of the rotor 31. Centrifugal force resulting from the high speed rotation of the rotor 31 provides for the continuous maintenance of an accumulation or layer 67 of comminuted material in the material collection zone 54 thereof and into which the nozzle 65 projects.

The nozzle 65 is secured at one end to the discharge pipe 56 with the opposite end terminating in a curved nozzle end portion 71. The curved end portion 71, which is provided with a material receiving opening 72, is formed so that the opening 72 substantially fills the material collection zone 54 and is disposed directly in the path of movement of the centrifugally accumulated layer 67 of material. The open end portion 71 of the nozzle is of generally annular configuration and, as best shown in FIGS. 3–5, is formed with an axially elongated first lip portion 73 which is of arcuate shape and which tapers rearwardly to an oppositely positioned second lip portion 74 also of arcuate shape. Each lip portion is of substantial circumferential length with the second lip portion 74 at least substantially fully conforming to the configuration of the material collection zone 54 of the rotor 31. In this respect the lip portion 74 is in the form of an arcuate scoop past which the inner surface of the zone 54 of the rotor moves at high speed and in close proximity thereto. Preferably the leading edge of the lip portion 74 is provided with a bevel 75 which aids in establishing and maintaining this close proximity. The intermediate arcuate inclined segments 76 of the nozzle are in the form of flat machined surfaces extending between the opposed ends of the oppositely positioned lip portions 73 and 74. FIG. 3 best illustrates the clean finishing of these surface portions to permit ready reception of material within the nozzle.

Received snugly against the inner concave surface of the first lip portion 73 is a solid plow member 77 of generally triangular configuration. As best illustrated in FIG. 6, the plow member 77 includes a specially configured concave-convex inner surface 78 of substantial area which basically fully overlies the inner surface of the lip portion 73. In describing the surface 78 it can be said that in a direction axially of the plow member (coaxially within the nozzle) the inner surface is formed with a concave configuration for flush and snug engagement with the inner surface of the lip portion 73 throughout the curving of the end portion 71 of the nozzle into communication with the main nozzle portion 65. Transversely of the inner surface 78 of the plow member the curvature is convex to fully conform with the transverse arcuate configuration of the lip portion 73. Thus then in all respects the inner surface 78 of the plow member 77 fully conforms with and snugly engages the inner surface area of the lip portion 73 throughout at least substantially the entire area thereof and throughout a distance extending substantially into the nozzle end portion 71.

The remaining exposed surfaces 79 and 80 are of concave configuration smoothly joining one another and the inner surface 78 throughout the areas of juncture to present a streamlined exposed surface area. The surfaces 79 and 80 are rather sharply angularly related and their area of juncture 81 is defined by a smooth radius. In the mounted position of the plow member 77 against the lip portion 73, the surface 79 extends rearwardly in inclined relation across the open end of the nozzle portion 71 toward the second lip portion 74 but terminates short thereof to define in conjunction therewith the material receiving opening 72. The remaining surface 80 extends from its junctures with the surface 79 at approximately right angles thereto inwardly of the nozzle end portion 71 and substantially directly away from the second lip portion 74 to, in effect, re-establish full availability of the interior of the nozzle 65 for the discharge of materials from the rotor. All of the edge surfaces of the plow member 77 are curvilinear to aid in streamline flow of the material through the restricted opening 72 of the nozzle, this feature aiding and preventing material detention which leads to deterioration and increases cleaning problems, the feature also preventing mashing of the small meat particles which have been cleanly sliced during comminution in the chopper portion of the assembly.

In certain applications it may be desirable to utilize a self-adjustable valving or gating arrangement to provide further variable control of the effective size of the material receiving opening 72. Basically the opening 72 should be somewhat larger than the cross sectional area of the annular layer 67 of material in the rotor to compensate for a slight build-up of meat particles at the opening 72.

A valving arrangement may be desirable to prevent re-entry of the material from the nozzle 65 into the rotor 31, which action causes turbulence and an undesirable increase in the temperature of the material. In order to effectively utilize a valving arrangement, the plow member 77 may be formed with a plurality of spaced projecting ear portions 82 defined by flat bottom recesses 83 formed in the juncture area 81 of the plow member between the surfaces 79 and 80. Each ear portion is formed with a transversely aligned bore 84 through which a transversely continuous pin 85 (FIG. 3) is received and to which a pivotal flat plate valve 86 is attached. The base of the valve 86 is also formed with suitable projecting ear portions received in the recesses 83 and the valve 86 is arranged as shown in FIG. 3 to pivot inwardly of the nozzle end portion 71 from outer edge engagement with the lip portion 74. A rearwardly projecting stop plate 87 may be carried by the valve 86, the plate being arranged to abut a portion of the surface 80 of the plow member to limit the extent to which the valve can be pivoted rearwardly within the nozzle. Normally the valve 86 would be fully pivoted rearwardly during the introduction of material through the opening 72, but in the event of any back pressure or tendency toward re-entry of the material from the nozzle into the rotor, the valve 86 would be operated into closed position as shown in solid lines in FIG. 3. In view of the operation of the chopper assembly under a vacuum, atmospheric pressure can be effective to induce re-entry.

The comminuted meat batter accumulated in the collection zone 54 of the rotor 31 is rather viscous. Thus, by restricting the size of the opening 72 of the nozzle end portion 71 to an area substantially equal to the area of the impinging viscous meat, a pressure is created which is adequate to cause the meat to move through the nozzle 65 and the discharge pipe 56 against the frictional forces developed between the viscous material and the walls thereof. The plow member 77 functions as a baffle in not only restricting the size of the material receiving opening 72 but also in directing the material toward the opening. In this respect the surface 79 of the plow member in combination with the projecting intermediate portions 76 of the nozzle end portion 71 functions as material deflectors for the controlled retention of material and direction thereof toward the restricted opening 72. This results in a complete confinement of material within the zone 54 during the passing of any portion of that zone by the nozzle. In this respect then the plow member 77 not only constitutes means by which the restricted opening 72 is defined, but also in conjunction with the projecting intermediate portions 76 confines and directs material toward the restricted opening.

The one-piece continuous outer surface configuration of the plow member is of particular importance with regard to the improved nozzle of the invention. With this form of plow member the same can be arranged for ready removable mounting in the nozzle thus permitting ease of manufacture, assembly and disassembly. As best shown in FIGS. 3 and 6, the inner surface 78 of the plow member 77 is formed near the outer end thereof with a tapped bore 88 which is confined within the plow member and does not extend through the outer surface 79. A suitable aperture 89 extends through the lip portion 73 and a fastener 90 in the form of a threaded bolt or screw extends from the outer surface of the lip portion 73 into the bore 88. This provides for complete attachment of the plow member in the nozzle in a fully protected manner. In other words, the attachment occurs in an area which is fully protected from contact with the material being moved through the nozzle thus adding to the cleanliness of the nozzle and preventing any fouling of the attachment elements which would add to the difficulties of intermittent cleaning operations.

Preferably the outer surface of the lip portion 73 has fixed thereto an apertured fastener attachment flange 91 by means of which a wire 92 or other suitable means may engage the head of the fastener 90, this head being provided with a suitable aperture therethrough as one means of attachment. The wire attachment constitutes a safety feature which prevents among other things a loss of the fastener 90 in the material being discharged from the rotor 31 in the event that the fastener should become disengaged from the plow member. Obviously if such occurs, the plow member is of sufficient size to be readily recoverable and its disengagement to be readily noticeable. However, the small fastener 90 may become readily lost in the material thus leading to the possibility of a substantial loss of product.

As mentioned above, the design of the plow member and the particular manner of removable mounting thereof is of unique importance in permitting efficient fast cleaning operations. The shut down time for the entire assembly does not require any substantial segment devoted solely to nozzle cleaning. The plow member including the valve (when used) can be very readily detached and separately cleaned, the smooth and rounded configuration of this member aiding in efficient cleaning thereof. The entire inner surface area of the nozzle end portion 71 is then available for complete cleaning and no crevices or recesses must be given special attention. The tapped bore 88 of the plow member is fully protected from material at all times in view of its generally central location in the inner surface 78. Accordingly, material will not accumulate within this bore. The plow member may be readily reassembled in the nozzle. No soldering or welding operations are necessary and, as a result, no recesses are available for the retention of material. Still further, there is no danger of flaking of metallic pieces into the material.

Obviously certain modifications and variations of the invention as hereinbefore set forth may be made without departing from the spirit and scope thereof, and therefore only such limitations should be imposed as are indicated in the appended claims.

I claim:

1. A pick-up nozzle for use in removing centrifugally accumulated material subject to stagnant deterioration from an inner surface of a rotatable bowl-like member, said nozzle comprising an open end portion of generally annular configuration having an axially elongated first lip portion of cross sectional arcuate shape tapering to an axially recessed second lip portion of cross sectional arcuate shape, a plow member mounted on the inner concave surface of said first lip portion and overextending the same within said open end portion, said plow member being of generally triangular configuration with an inner surface thereof being convex and in flush sealed engagement with the inner concave surface of said first lip portion throughout, said plow member having two angularly related outer surfaces arranged at approximately right angles with one of said surfaces being longer than the other and extending in inclined relation across said open end portion towards said second lip portion but terminating short thereof to define therewith the material receiving opening, the other of said surfaces being inclined away from said second lip portion inwardly of said open end portion, and fastener means extending through said first lip portion from the outer surface thereof and detachably engaging said plow member through the inner convex surface thereof.

2. The pick-up nozzle of claim 1 wherein said angularly related surfaces of said plow member and the juncture thereof include groove-like recesses defining therebetween projecting ear-like portions to which a valve member is pivotally attached, said valve member extending transversely of said juncture across said material receiving opening and being pivotal into said nozzle in response to material introduced thereinto.

References Cited by the Examiner

UNITED STATES PATENTS 1,519,928 12/24 Priesnitz _____ 222—328
2,851,073 9/58 Schaller _____ 222—162 X
3,065,882 11/62 Vedvik _____ 222—162

LOUIS J. DEMBO, *Primary Examiner.*